US012755880B2

(12) United States Patent
Mikami

(10) Patent No.: US 12,755,880 B2
(45) Date of Patent: Oct. 6, 2026

(54) MAGNETIC RESIN COMPOSITION, CURED PRODUCT, AND ELECTRONIC COMPONENT

(71) Applicant: FUJIFILM Corporation, Tokyo (JP)

(72) Inventor: Tatsuo Mikami, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 933 days.

(21) Appl. No.: 18/046,727

(22) Filed: Oct. 14, 2022

(65) Prior Publication Data

US 2023/0078286 A1 Mar. 16, 2023

Related U.S. Application Data

(63) Continuation of application No. PCT/JP2021/014838, filed on Apr. 8, 2021.

(30) Foreign Application Priority Data

Apr. 17, 2020 (JP) ................................ 2020-074159

(51) Int. Cl.

| | |
|---|---|
| ***H01F 1/37*** | (2006.01) |
| ***C08K 3/08*** | (2006.01) |
| ***C08K 3/22*** | (2006.01) |
| ***C08L 63/00*** | (2006.01) |
| ***H01F 1/147*** | (2006.01) |
| ***H01F 1/33*** | (2006.01) |
| ***H01F 1/34*** | (2006.01) |

(52) U.S. Cl.

CPC ........... *H01F 1/14758* (2013.01); *C08K 3/08* (2013.01); *C08K 3/22* (2013.01); *H01F 1/344* (2013.01); *C08K 2003/0856* (2013.01); *C08K 2003/0862* (2013.01); *C08K 2003/2296* (2013.01); *C08K 2201/005* (2013.01); *C08K 2201/01* (2013.01)

(58) Field of Classification Search

CPC ........ H01F 1/28; H01F 1/14758; H01F 1/344; H01F 1/11; H01F 1/4733; H01F 1/16; H01F 1/20; H01F 1/47; H01F 1/37; H01F 1/147; C08K 3/22; C08L 63/00

See application file for complete search history.

(56) References Cited

U.S. PATENT DOCUMENTS

| | | | | |
|---|---|---|---|---|
| 2017/0341341 | A1* | 11/2017 | Kim | ........................ B32B 27/40 |
| 2018/0138131 | A1 | 5/2018 | Kawabata | |
| 2020/0251263 | A1 | 8/2020 | Kojima et al. | |

FOREIGN PATENT DOCUMENTS

| | | | |
|---|---|---|---|
| CN | 107415353 | A | 12/2017 |
| CN | 108074878 | A | 5/2018 |
| JP | 7-169613 | A | 7/1995 |
| JP | 11-126721 | A | 5/1999 |
| JP | 2005-150257 | A | 6/2005 |
| JP | 2007-123376 | A | 5/2007 |
| JP | 2012-129384 | A | 7/2012 |
| JP | 2012-177044 | A | 9/2012 |
| JP | 2013-26324 | A | 2/2013 |
| JP | 2014-146698 | A | 8/2014 |
| JP | 2015-135900 | A | 7/2015 |
| JP | 2016-006163 | A | 1/2016 |
| JP | 2018-82142 | A | 5/2018 |
| JP | 2020-13943 | A | 1/2020 |
| WO | 2019/065923 | A1 | 4/2019 |

OTHER PUBLICATIONS

Shen et al., "Effect on Properties of Bonded NdFeB Magnet", Journal of Hebei University of Technology, vol. 32, No. 4, Aug. 2003 (5 pages total).

Office Action issued Jan. 21, 2025 in Chinese Application No. 202180028246.8.

Japanese Office Action dated Jul. 18, 2023 in Japanese Application No. 2022-515333.

International Search Report issued Jun. 1, 2021 in International Application No. PCT/JP2021/014838.

Written Opinion of the International Searching Authority issued Jun. 1, 2021 in International Application No. PCT/JP2021/014838.

International Preliminary Report on Patentability issued Oct. 13, 2022 in International Application No. PCT/JP2021/014838.

Office Action dated Nov. 21, 2023, issued in Japanese Application No. 2022-515333.

* cited by examiner

*Primary Examiner* — Matthew E. Hoban
*Assistant Examiner* — Lynne Edmondson
(74) *Attorney, Agent, or Firm* — Sughrue Mion, PLLC

(57) ABSTRACT

Provided are a magnetic resin composition including magnetic particles and an epoxy resin having an epoxy equivalent of 400 g/eq or more, in which a filling rate of the magnetic particles is 70% or more on an area basis; a cured product obtained by curing the magnetic resin composition; and an electronic component including the cured product.

13 Claims, No Drawings

MAGNETIC RESIN COMPOSITION, CURED PRODUCT, AND ELECTRONIC COMPONENT

CROSS-REFERENCE TO RELATED APPLICATIONS

This application is a Continuation of PCT International Application No. PCT/JP2021/014838 filed on Apr. 8, 2021, which claims priority under 35 U.S.C. § 119(a) to Japanese Patent Application No. 2020-074159 filed on Apr. 17, 2020. Each of the above applications is hereby expressly incorporated by reference, in its entirety, into the present application.

BACKGROUND OF THE INVENTION

1. Field of the Invention

The present invention relates to a magnetic resin composition, a cured product, and an electronic component.

2. Description of the Related Art

In the related art, a member of an electronic component (for example, a member of a coil part such as an inductor, a transcore, an electromagnetic noise absorber, an electromagnetic wave absorber, and the like) has been manufactured using a composition including magnetic particles (for example, see JP2007-123376A and JP1995-169613A (JP-H7-169613A)).

SUMMARY OF THE INVENTION

An electronic component for a high-frequency device such as a personal computer, an automobile, a mobile information terminal such as a mobile phone, a flat panel display, a game device, a road information system, and a wireless local area network (LAN) has been used can play a role of noise reducing, voltage stabilization, and the like of the high-frequency device. It is said that, in a case where such an electronic component is provided with a member including magnetic particles, it leads to an increase in magnetic permeability (specifically, real part μr' of complex magnetic permeability), thereby enabling reduction in size of the electronic component. In this regard, in recent years, with the increase in operating frequency of the electronic component, a member having a high magnetic permeability μr' in a high frequency band (for example, approximately 100 MHz (megahertz)) is desired as the member including magnetic particles.

The above-described member including magnetic particles can be manufactured, for example, as follows. A cured product is manufactured by curing a composition including magnetic particles and a resin. The cured product is subjected to processing such as cutting into a size and/or shape according to the intended use. In this way, the member including magnetic particles can be manufactured. However, in a case where cracks occur in the cured product during the processing, quality of the manufactured member deteriorates. Therefore, it is desired that the composition including magnetic particles and a resin is less likely to have cracks in the cured product during the processing.

However, according to the study by the present inventor, the composition including magnetic particles and a resin in the related art is required to be further improved with respect to the above-described points.

An object of the present invention is to provide a composition including magnetic particles and a resin, with which a cured product having a high magnetic permeability μr' in a high frequency band and capable of suppressing occurrence of cracks during processing can be manufactured.

An aspect of the present invention relates to a magnetic resin composition comprising magnetic particles and an epoxy resin having an epoxy equivalent of 400 g/eq or more, in which a filling rate of the magnetic particles is 70% or more on an area basis.

In one aspect, a void ratio of the above-described magnetic resin composition can be less than 0.30% on an area basis.

In one aspect, the above-described magnetic particles can include metal particles.

In one aspect, the above-described metal particles can include Ni and Fe.

In one aspect, the above-described metal particles can further include Mo.

In one aspect, an average particle size of the above-described metal particles can be less than 10.0 μm.

In one aspect, the above-described magnetic particles can further include ferrite particles.

In one aspect, an average particle size of the above-described ferrite particles can be less than 1.0 μm.

In one aspect, a coercive force Hc of the above-described ferrite particles can be 30.0 Oe or more.

An aspect of the present invention relates to a cured product obtained by curing the above-described magnetic resin composition.

An aspect of the present invention relates to an electronic component including the above-described cured product.

According to the embodiment of the present invention, it is to provide a magnetic resin composition including magnetic particles and a resin, the magnetic resin composition having a high magnetic permeability μr' in a high frequency band and capable of suppressing occurrence of cracks during processing. In addition, according to the embodiment of the present invention, it is possible to provide a cured product obtained by curing the above-described magnetic resin composition and an electronic component including the cured product.

DESCRIPTION OF THE PREFERRED EMBODIMENTS

[Magnetic Resin Composition]

A magnetic resin composition (hereinafter, also simply referred to as a "composition") according to one embodiment of the present invention includes magnetic particles and an epoxy resin having an epoxy equivalent of 400 g/eq or more, in which a filling rate of the magnetic particles is 70% or more on an area basis.

In the present invention and the present specification, the "filling rate" of the magnetic particles is determined by the following method. In addition, unless otherwise specified, the following process and operation are performed in the air at room temperature in a range of 20° C. to 25° C. Unless otherwise specified, the same applies to the various processes and operations described in the present specification.

1. Manufacturing of Film for Measuring Filling Rate

A support (for example, a resin film) having a peeled surface which has been subjected to a peeling treatment is obtained as a commercially available product or manufactured and prepared by a known method. A target composition used for determining the filling rate is applied to the peeled surface of the support, and then heated in a heat treatment apparatus having an internal atmospheric temperature of 80° C. for 1 hour. Thereafter, the support is heated on a hot plate having a set temperature of 120° C. for 10 minutes. In general, a film in which the above-described composition is partially cured is formed on the peeled surface of the support. The film is peeled off from the peeled surface of the support, and then heated in a heat treatment apparatus having an internal atmospheric temperature of 150° C. for 20 minutes. Using the heated film, the filling rate is determined by the following method.

2. Acquisition of Scanning Electron Microscope Image and Calculation of Filling Rate A sample for cross-sectional observation is cut out from a randomly determined position of the film manufactured in 1. described above by a known unit such as a microtome. The sample for cross-sectional observation is observed with a scanning electron microscope (SEM) to capture a cross-section image (SEM image). As the SEM, an electric field radiation type scanning electron microscope (field emission (FE)-SEM) is used. The captured SEM image is a secondary electron image. Using the FE-SEM, the sample for cross-sectional observation is set on a stage, and a cross-section SEM image having a visual field of 32 μm×42 μm is obtained under the conditions of an acceleration voltage of 3 kV and an observation magnification of 3000 times. After converting the obtained cross-section SEM image into a gray scale image, a portion of the magnetic particles is identified by binarization processing with an intermediate brightness between a brightness of the magnetic particles and a brightness of the other regions, and a proportion (area basis) occupied by the identified portion of the magnetic particles is calculated. In addition, with regard to the void ratio described later, after converting the obtained cross-section SEM image as described above into a gray scale image, a void portion (portion where no magnetic particles, resin, and optional additives are present) is identified by binarization processing with an intermediate brightness between a brightness of a void portion and a brightness of the other regions, and a proportion (area basis) occupied by the identified void portion is calculated. It is also possible to specify the portion of the magnetic particles and/or the void portion in the cross-section SEM image by performing an elemental analysis of the sample for cross-sectional observation as necessary.

The above-described operation is performed on five samples for cross-sectional observation cut out from different positions of the film manufactured in 1. described above, and the filling rate of the magnetic particles can be obtained as an arithmetic mean of the obtained five values. The same applies to the void ratio.

In addition, in the present invention and the present specification, an epoxy equivalent of the epoxy resin is a mass of the epoxy resin including one equivalent of an epoxy group, and is obtained according to JIS K 7236:2001. With regard to a unit of the epoxy equivalent, "eq" indicates an equivalent that is a unit which cannot be converted into the SI unit system.

With regard to the above-described magnetic resin composition, the fact that the filling rate of the magnetic particles is within the above-described range can contribute to the fact that a cured product obtained by curing the composition can exhibit a high magnetic permeability μr' in the high frequency band. In addition, the fact that the resin included in the above-described magnetic resin composition is an epoxy resin having an epoxy equivalent in the above-described range can contribute to the fact that it is possible to suppress the occurrence of cracks during processing of the cured product obtained by curing the composition. Hereinafter, the above-described magnetic resin composition will be described in more detail.

<Magnetic Particles>

(Filling Rate)

The filling rate (area basis) of the magnetic particles in the above-described magnetic resin composition is 70% or more. This can contribute to the fact that a cured product obtained by curing the composition can exhibit a high magnetic permeability μr' in the high frequency band. From the viewpoint of further increasing the magnetic permeability, the above-described filling rate is preferably 71% or more and more preferably 72% or more. In addition, the above-described filling rate can be, for example, 90% or less, 85% or less, 80% or less, or 75% or less. However, from the viewpoint of still more increasing the magnetic permeability, it is preferable that the filling rate of the magnetic particles is high, so that the above-described filling rate may exceed the value exemplified here.

As the above-described magnetic particles, one kind selected from the group consisting of magnetic particles generally referred to as soft magnetic particles, such as metal particles and ferrite particles, can be used, or two or more kinds thereof can be used in combination.

(Metal Particles)

In the present invention and the present specification, the "metal particles" include pure metal particles consisting of a single metal element and particles of an alloy of one or more kinds of metal elements and one or two or more kinds of other metal elements and/or non-metal elements. The metal particles may or may not be crystalline. That is, the metal particles may be crystalline particles or amorphous particles. Examples of the metal or non-metal element included in the metal particles include Ni, Fe, Co, Mo, Cr, Si, B, and P. The metal particles may or may not include a component other than the constituent elements of the metal (including the alloy). In addition to the constituent elements of the metal (including the alloy), the metal particles may include, at any content, elements included in the additive which may be optionally added and/or elements included in impurities which may be unintentionally mixed in the manufacturing process of the metal particles. In the metal particles, a content of the constituent elements of the metal (including the alloy) is preferably 90.0% by mass or more and more preferably 95.0% by mass or more, and may be 100% by mass, less than 100% by mass, 99.9% by mass or less, or 99.0% by mass or less.

In one aspect, the metal particles can include Ni and Fe, and can further include Mo. For example, with regard to the member of the electronic component, the fact that a decrease in magnetic permeability μr' in an acidic environment is suppressed is preferable from the viewpoint of providing a member in which performance is less deteriorated in a case of being used for a long period of time and/or in a case of being placed in a harsh environment. From the viewpoint of suppressing such a decrease in magnetic permeability μr', magnetic particles in which oxidation is unlikely to proceed in the acidic environment are preferable. From this point of view, metal particles including Ni and Fe are preferable, and metal particles including Ni, Fe, and Mo are more preferable. From the viewpoint of further suppressing the progress of oxidation in the acidic environment, in the metal particles including Ni and Fe or further including Mo as the metal particles, the total content of Ni, Fe, and Mo is preferably 90.0% by mass or more and more preferably 95.0% by mass or more, and may be 100% by mass, less than 100% by mass, 99.9% by mass or less, or 99.0% by mass or less. A content of Ni is preferably 20.0% by mass or more and more preferably 30.0% by mass or more, and preferably 90% by mass or less and more preferably 80% by mass or less. A content of Mo is preferably 0.5% by mass or more and more preferably 2% by mass or more, and preferably 20% by mass or less and more preferably 10% by mass or less.

An average particle size of the metal particles can be, for example, 15.0 μm or less, 14.0 μm or less, 13.0 μm or less, 12.0 μm or less, 11.0 μm or less, 10.0 μm or less, or less than 10.0 μm. With regard to physical properties of the member included in the electronic component, from the viewpoint of reducing loss of the electronic component, it is desirable that a loss tangent tan δ is small at an operating frequency of the electronic component. The loss tangent tan δ is calculated by tan δ=μr''/μr' from a real part μr' of a complex magnetic permeability and an imaginary part μr'' of the complex magnetic permeability. As the metal particles, from the viewpoint of making it possible to manufacture a member with a small loss tangent tan δ in a high frequency band (for example, approximately 100 MHz), metal particles having an average particle size of less than 10.0 μm are preferable, metal particles having an average particle size of 9.9 μm or less are more preferable, metal particles having an average particle size of 9.5 μm or less are still more preferable, metal particles having an average particle size of 9.0 μm or less are even more preferable, and metal particles having an average particle size of 8.5 μm or less are even still more preferable. In addition, the average particle size of the metal particles can be, for example, 3.0 μm or more, 3.5 μm or more, 4.0 μm or more, or more than 4.0 μm. From the viewpoint of further increasing the magnetic permeability, the average particle size of the metal particles is preferably more than 4.0 μm, more preferably 4.1 μm or more, and still more preferably 4.5 μm or more.

In the present invention and the present specification, unless otherwise specified, average particle sizes of various particles are values measured by the following method using a scanning electron microscope.

The particles are captured using a transmission electron microscope at a capturing magnification of 3000 to obtain an image of the particles. A target particle is selected from the obtained image, an outline of the particle is traced by a digitizer, and a size of the particle (primary particle) is measured. The primary particle refers to an independent particle without being aggregated.

The measurement described above is performed on 500 particles randomly extracted. An arithmetic mean of the particle sizes of the 500 particles thus obtained is defined as an average particle size of the particles. As the above-described scanning electron microscope, for example, FE-SEM S4800 manufactured by Hitachi, Ltd. can be used. In addition, the measurement of the particle size can be performed by known image analysis software, for example, image analysis software KS-400 manufactured by Carl Zeiss.

In the present invention and the present specification, unless otherwise specified, a size of the primary particle of the particles is represented by, (1) in a case where the shape of the particles observed in the above-described particle image is needle-like, spindle-like, columnar (however, the height is greater than the maximum major diameter of the bottom surface), or the like, the length of the major axis constituting the particles, that is, a major axis length;

(2) in a case where the shape of the particles observed in the above-described particle image is plate-like or columnar (however, the thickness or the height is smaller than the maximum major diameter of the plate surface or the bottom surface), the maximum major diameter of the plate surface or bottom surface; and (3) in a case where the shape of the particles observed in the above-described particle image is spherical, polyhedral, amorphous, or the like, in which the major axis constituting the particles cannot be identified from the shape, the equivalent circle diameter which is obtained by a circular projection method.

The average particle size of the magnetic particles included in the magnetic resin composition can be obtained, for example, by performing the above-described measurement on the magnetic particles used for manufacturing the magnetic resin composition or on the magnetic particles of the same lot as the magnetic particles. In addition, for example, by extracting the magnetic particles from the magnetic resin composition or the cured product thereof by a known method and performing the above-described measurement on the extracted magnetic particles, the average particle size of the magnetic particles included in the magnetic resin composition can be obtained. The same applies to a coercive force Hc of the magnetic particles.

With regard to magnetic properties of the metal particles, a coercive force Hc of the metal particles can be in the same range as particles generally referred to as soft magnetic particles, and for example, the coercive force Hc of the metal particles can be 100.0 Oe (oersted) or less, 90.0 Oe or less, 80.0 Oe or less, 70.0 Oe or less, 60.0 Oe or less, 50.0 Oe or less, 40.0 Oe or less, 30.0 Oe or less, less than 30.0 Oe, or 20.0 Oe or less. In addition, the coercive force Hc of the metal particles can be, for example, 1.0 Oe or more, 2.0 Oe or more, or 3.0 Oe or more. The unit is 1 Oe (1 oersted)=79.6 A/m.

The coercive force Hc of the magnetic particles can be measured by a known vibrating sample magnetometer. In the present invention and the present specification, the coercive force Hc is a value measured at a measurement temperature of 25° C.±1° C. The measurement temperature is an atmospheric temperature around particles to be measured in a case of the measurement of the coercive force.

(Ferrite Particles)

As the above-described magnetic particles, ferrite particles can also be used, and from the viewpoint of further increasing the magnetic permeability, it is preferable to use a combination of metal particles and ferrite particles. A content of the ferrite particles is preferably 1 part by mass or more, more preferably 2 parts by mass or more, and still more preferably 3 parts by mass or more with respect to 100 parts by mass of the metal particles. In addition, the content of the ferrite particles can be, for example, 20 parts by mass or less, 15 parts by mass or less, or 10 parts by mass or less with respect to 100 parts by mass of the metal particles.

The ferrite particles are particles which show a ferrite crystal structure by X-ray diffraction analysis. As the ferrite particles, for example, one kind or two or more kinds of ferrite particles having a known composition, such as Ni—Zn ferrite particles, Mn—Zn ferrite particles, and Ni—Cu—Zn ferrite particles, can be used.

From the viewpoint of increasing the filling rate of the magnetic particles in the above-described magnetic resin composition, an average particle size of the ferrite particles is preferably less than 1.0 μm and more preferably 0.9 μm or less. In addition, the average particle size of the ferrite particles can be, for example, 0.1 μm or more, 0.3 μm or more, or 0.5 μm or more. In one aspect, from the viewpoint of increasing the filling rate of the magnetic particles in the above-described magnetic resin composition, it is preferable to use, as the ferrite particles, ferrite particles having an average particle size smaller than that of the metal particles.

With regard to magnetic properties of the ferrite particles, a coercive force Hc of the ferrite particles can be in the same range as particles generally referred to as soft magnetic particles, and for example, the coercive force Hc of the ferrite particles can be 100.0 Oe or less, 90.0 Oe or less, 80.0 Oe or less, 70.0 Oe or less, 60.0 Oe or less, or 50.0 Oe or less. In addition, the coercive force Hc of the ferrite particles can be, for example, 1.0 Oe or more, 5.0 Oe or more, 10.0 Oe or more, 15.0 Oe or more, 20.0 Oe or more, 25.0 Oe or more, or 30.0 Oe or more. From the viewpoint of making it possible to manufacture a member with a small loss tangent tan δ in a high frequency band (for example, approximately 100 MHz), it is preferable to use, as the ferrite particles, ferrite particles having a coercive force Hc of 30.0 Oe or more. From this viewpoint, the coercive force Hc of the ferrite particles is more preferably 35.0 Oe or more and still more preferably 40.0 Oe or more.

(Epoxy Resin)

The above-described magnetic resin composition includes an epoxy resin having an epoxy equivalent of 400 g/eq or more. The epoxy resin is a resin including an epoxy group, and is a thermosetting resin. A composition including an epoxy resin can be cured by opening a ring of an epoxy group included in the epoxy resin by heating to form a crosslinking structure. In the above-described magnetic resin composition, the fact that the epoxy equivalent of the epoxy resin included together with the magnetic particles is 400 g/eq or more can contribute to the fact that, from this composition, it is possible to manufacture a cured product in which the occurrence of cracks is suppressed during processing. The epoxy equivalent is 400 g/eq or more, preferably 401 g/eq or more, more preferably 403 g/eq or more, and still more preferably 405 g/eq or more. In addition, from the viewpoint of improving strength of the cured product formed from the above-described magnetic resin composition, the epoxy equivalent is preferably 2000 g/eq or less, more preferably 1800 g/eq or less, and still more preferably 1600 g/eq or less.

A content of the epoxy resin in the above-described magnetic resin composition is preferably in a range of 1 to 20 parts by mass and more preferably in a range of 3 to 10 parts by mass with respect to 100 parts by mass of the magnetic particles.

Examples of the epoxy resin include various epoxy resins, such as a bisphenol A epoxy resin, a bisphenol F epoxy resin, a bisphenol S epoxy resin, a bisphenol AF epoxy resin, a dicyclopentadiene epoxy resin, a trisphenol epoxy resin, a naphthol novolak epoxy resin, a phenol novolak epoxy resin, a tert-butyl-catechol epoxy resin, a naphthalene epoxy resin, a naphthol epoxy resin, an anthracene epoxy resin, a glycidylamine epoxy resin, a glycidyl ester epoxy resin, a cresol novolak epoxy resin, a biphenyl epoxy resin, a linear aliphatic epoxy resin, an epoxy resin having a butadiene structure, an alicyclic epoxy resin, a heterocyclic epoxy resin, an epoxy resin containing a spiro ring, a cyclohexanedimethanol epoxy resin, a naphthylene ether epoxy resin, and a trimethylol epoxy resin. The epoxy resin may be used alone or in combination of two or more at an arbitrary proportion. In the cured product obtained by curing the above-described magnetic resin composition, a part or all of the epoxy groups included in the epoxy resin can be included in a state in which the ring is opened to form a crosslinking structure. In addition, in a case where the above-described magnetic resin composition includes two or more kinds of epoxy resins, the content of the epoxy resin described above is the total content of these two or more kinds of epoxy resins. The same applies to the content and content rate of other components.

(Optional Component)

In one aspect, the above-described magnetic resin composition can include only one or more kinds of the magnetic particles and one or more kinds of the epoxy resins. In addition, in another aspect, the above-described magnetic resin composition can include a known additive in an arbitrary amount. Examples of the additive include a component which can function as a curing agent for the epoxy resin, a component which can function as a dispersing agent for the magnetic particles, a coupling agent, and a surfactant. Such components are known, and examples thereof include a phenol compound, an amine compound, an imidazole compound, an acid anhydride, and a polymer-based dispersing agent. For example, the use of a dispersing agent can contribute to increasing dispersibility of the magnetic particles in the above-described magnetic resin composition and improving the filling rate. In addition, the void ratio can be reduced by increasing the dispersibility of the magnetic particles.

The above-described magnetic resin composition may be a composition not including a solvent, and for example, one or more kinds of solvents can also be included to enhance coatability. Examples of the solvent include various organic solvents such as ketone solvents such as acetone, methyl ethyl ketone, and cyclohexanone, acetate solvents such as ethyl acetate, butyl acetate, cellosolve acetate, propylene glycol monomethyl ether acetate, and carbitol acetate, carbitols such as cellosolve and butylcarbitol, aromatic hydrocarbon solvents such as toluene and xylene, and amide solvents such as dimethylformamide, dimethylacetamide, and N-methylpyrrolidone. The solvent can be selected, for example, in consideration of solubility and the like of the components used in the preparation of the above-described magnetic resin composition. As the solvent, one kind of solvent can be used, or two or more kinds of solvents can be mixed in an arbitrary proportion and used. In a case where the above-described magnetic resin composition includes a solvent, the solvent can be used in an arbitrary amount in consideration of the coatability and the like of the composition.

<Void Ratio>

With regard to the above-described magnetic resin composition, the fact that the void ratio (area basis) determined by the method described above is low can contribute to increasing the filling rate of the magnetic particles and/or further increasing the magnetic permeability of the cured product formed from this composition. From this point, the void ratio of the above-described magnetic resin composition is preferably less than 0.30%, more preferably 0.25% or less, still more preferably 0.20% or less, even more preferably 0.15% or less, still even more preferably 0.10% or less, further more preferably 0.08% or less, further still more preferably 0.06% or less, and further even more preferably 0.04% or less. The void ratio of the above-described magnetic resin composition can be, for example, 0% or more, more than 0%, or 0.01% or more.

The above-described magnetic resin composition can be prepared by sequentially mixing various components in any order or mixing them simultaneously. In addition, as necessary, a dispersion treatment can be performed using a known disperser such as a ball mill, a beads mill, a sand mill, or a roll mill, and/or a stirring treatment can also be performed using a known stirrer such as a shaking type stirrer.

[Cured Product and Electronic Component]

One embodiment of the present invention relates to a cured product obtained by curing the magnetic resin composition.

In addition, one embodiment of the present invention relates to an electronic component including the above-described cured product.

A cured product obtained curing the above-described magnetic resin composition can be manufactured, for example, as follows in one aspect.

The above-described magnetic resin composition is applied to a support. The application can be performed using a known coating device such as a blade coater or a die coater. The application can be performed by a so-called roll-to-roll method or a batch method. Examples of the support include films of various resins such as polyesters such as polyethylene terephthalate (PET) and polyethylene naphthalate (PEN), polycarbonate (PC), acrylics such as polymethylmethacrylate (PMMA), cyclic polyolefins, triacetyl cellulose (TAC), polyether sulfide (PES), polyether ketone, and polyimide. With regard to these resin films, paragraphs 0081 to 0086 of JP2015-187260A can be referred to. As the support, a support which is subjected to a peeling treatment by a known method on a surface (surface to be coated) to which the magnetic resin composition is applied can be used. One aspect of the peeling treatment includes forming a release layer. With regard to the release layer, paragraph 0084 of JP2015-187260A can be referred to. In addition, as the support, a commercially available peeled resin film can also be used. By using a support on which the surface to be coated has been subjected to the peeling treatment, it is possible to easily separate the cured product from the support after the magnetic resin composition is subjected to a curing treatment.

In addition, in one aspect, the above-described magnetic resin composition can be directly applied to an electronic component to which a coating layer obtained by curing this composition is to be provided.

The coating layer formed by applying the above-described magnetic resin composition can be subjected to a drying treatment by a known method, such as heating or blowing hot air. The drying treatment can be performed, for example, under conditions which can volatilize the solvent included in the magnetic resin composition. After optionally performing the drying treatment, the above-described magnetic resin composition can be subjected to a curing treatment. The curing treatment can be a heat treatment for advancing the curing reaction of the epoxy resin (specifically, ring opening of the epoxy group and formation of a crosslinking structure). Conditions (temperature, time, and the like) of the heat treatment can be set according to the type of the epoxy resin included in the magnetic resin composition, composition of the composition, and the like. The heat treatment may be a one-step heat treatment or a multi-step heat treatment having two or more steps. For example, after the curing reaction is partially advanced by a heat treatment of the first step to form a partially cured product, the partially cured product can be subjected to a heat treatment of the second and subsequent steps to allow the curing reaction to proceed sufficiently.

In the present invention and the present specification, the cured product obtained by curing the above-described magnetic resin composition includes a partially cured product (generally referred to as a semi-cured product and the like) in which only a part of the curing reaction of the epoxy resin included in the magnetic resin composition has progressed, and a cured product (generally referred to as a fully cured product and the like) in which the progress of the curing reaction is saturated or nearly saturated.

The above-described cured product includes a form in which one or more kinds of processing treatments are applied after the curing treatment and a form before the processing treatment. Examples of the processing treatment include a treatment of cutting the cured product into a predetermined size and shape by a known cutting unit such as a cutter. The size and shape are not particularly limited as long as the cured product after processing may be determined according to the type of the electronic component used as the member. With the cured product obtained by curing the above-described magnetic resin composition, it is possible to suppress the occurrence of cracks during processing.

The above-described cured product can be used as a member of an electronic component. Examples of the member of the electronic component include a member of a coil part such as an inductor, a transcore, an electromagnetic noise absorber, and an electromagnetic wave absorber. As an example, with regard to details of the coil part, paragraphs 0042 to 0061 and drawings of JP2017-199801A can be referred to. For example, the above-described cured product can be provided in place of a magnetic resin layer in the coil part described in JP2017-199801A. In addition, with regard to the inductor and the electromagnetic noise absorber, for example, paragraphs 0056 and 0057 of JP2013-204067A can be referred to. For example, the above-described magnetic resin composition can be used in place of a magnetic paste described in JP2013-204067A. With regard to the inductor, paragraphs 0032 to 0041 and drawings of JP2006-237506A can be referred to. For example, the above-described magnetic resin composition can be used in place of a magnetic paste described in JP2006-237506A. In addition, with regard to the electromagnetic wave absorber, for example, paragraphs 0015 and 0016 and FIGS. 1, 3, and 4 of JP2001-77585A can be referred to. For example, the above-described magnetic resin composition can be used in place of an electromagnetic wave absorbing paste described in JP2001-77585A.

In addition, examples of one aspect of the electronic component include an inductor generally referred to as a planar inductor. In one aspect, the above-described electronic component can be an electronic component including an inductor element. Examples of such an electronic component include a wiring board. With regard to details of the wiring board, paragraphs 0098 to 0155 and FIGS. 1 to 3 of JP2015-187260A can be referred to. The wiring board may further include a semiconductor chip or the like. In addition, various types of semiconductor devices can be manufactured by using such a wiring board. The semiconductor device including such a wiring board can be suitably used for a high-frequency device such as an automobile, a mobile information terminal such as a mobile phone, a flat panel display, a game device, a road information system, and a wireless LAN.

As the electronic component, in recent years, attention has been paid to an electronic component in a high frequency band, which has an operating frequency of approximately 100 MHz. The cured product obtained by curing the magnetic resin composition according to one embodiment of the present invention can have, for example, a magnetic permeability $\mu r'$ at a frequency of 100 MHz of 13.5 or more or 14.0 or more. The above-described magnetic permeability $\mu r'$ can be, for example, 20.0 or less or 18.0 or less, and may exceed the value exemplified here. In addition, the cured product obtained by curing the magnetic resin composition according to one embodiment of the present invention can have, for example, a loss tangent tan δ at a frequency of 100 MHz of 0.40 or less, 0.38 or less, 0.35 or less, or 0.30 or less. The above-described loss tangent tan δ can be, for example, 0.20 or more, and can be less than 0.20. From the viewpoint of reduction in size of the electronic component, it is preferable that the magnetic permeability μr' at a frequency of 100 MHz is within the above-described range, and from the viewpoint of low loss, it is preferable that the loss tangent tan δ at a frequency of 100 MHz is within the above-described range. The magnetic permeability μr' can be measured using a known magnetic permeability measuring device. The loss tangent tan δ can be calculated from the magnetic permeability μr' and μr" measured using the magnetic permeability measuring device.

EXAMPLES

Hereinafter, the present invention will be described in more detail with reference to Examples. Here, the present invention is not limited to embodiments shown in Examples.

Physical properties of magnetic particles described below are values measured by the following methods.

<Average Particle Size of Magnetic Particles>

The average particle size of each magnetic particle is a value measured by the method described above using FE-SEM 54800 manufactured by Hitachi, Ltd. as a scanning electron microscope (FE-SEM), and image analysis software KS-400 manufactured by Carl Zeiss as image analysis software.

<Coercive Force Hc of Magnetic Particles>

The coercive force Hc of each magnetic particle was measured at a magnetic field strength of 15000 Oe using a vibrating sample magnetometer (manufactured by Toei Industry Co., Ltd.), and the coercive force Hc was obtained from the obtained hysteresis curve (called "M-H curve").

Example 1

<Preparation of Coating Liquid (Magnetic Resin Composition)>

100 parts by mass of molybdenum permalloy alloy particles (average particle size: see Table 1, coercive force Hc: 7.0 Oe, Ni content: 79.8% by mass, Fe content: 16.2% by mass, Mo content: 3.9% by mass) as metal particles, 6 parts by mass of an epoxy resin (EXA-4816 manufactured by DIC Corporation, epoxy equivalent: see Table 1), 0.2 parts by mass of an imidazole-type curing agent (jER CURE IBM 112 manufactured by Mitsubishi Chemical Corporation), 0.5 parts by mass of a dispersing agent (DISPERBYK-108 manufactured by BYK Chemie Japan), and 4 parts by mass of methyl ethyl ketone were charged into a plastic bottle, and a coating liquid was prepared by mixing the components for 30 minutes with a shaking type stirrer.

<Manufacturing of Film>

The above-described coating liquid was applied to a peeled surface of a peeled PET film (PET75TR manufactured by NIPPA Corporation) by a blade coater having a coating gap of 100 dried in a drying device having an internal atmospheric temperature of 80° C. for 1 hour, and then heated on a hot plate (set temperature: 120° C.) for 10 minutes to obtain a partially cured film. The film was peeled off from the peeled PET film and heated in an oven having an internal atmospheric temperature of 150° C. for 20 minutes to obtain a cured film.

<Measurement of Magnetic Permeability>

A rectangular sample having a size of 2 mm×10 mm was cut out from the above-described cured film, and thicknesses at 10 points were measured with a micrometer. The arithmetic mean of the thicknesses was 30 μm. The magnetic permeability (μr' and μr") of the rectangular sample was measured at a frequency of 100 MHz using a magnetic permeability measuring device per01 (manufactured by KEYCOM Corp.). The loss tangent tan δ was calculated from the measured magnetic permeability (μr' and μr").

<Measurement of Filling Rate of Magnetic Particles and Measurement of Void Ratio>

A sample for cross-sectional observation was cut out from the above-described cured film using a microtome. The filling rate of the magnetic particles and the void ratio were measured by the method described above using FE-SEM 54800 manufactured by Hitachi, Ltd. as a scanning electron microscope (FE-SEM).

<Observation of Cracks>

A film piece having a size of 2 cm×2 cm was cut out from the above-described cured film using a cutter, and a surface of the film piece was visually observed to confirm the presence or absence of cracks in an outer peripheral portion.

<Measurement of Magnetic Permeability Ratio Before and After Immersion in Hydrochloric Acid>

A rectangular sample having a size of 2 mm×10 mm was cut out from the above-described cured film, and the magnetic permeability (μr') of the rectangular sample was measured at a frequency of 100 MHz using a magnetic permeability measuring device per01 (manufactured by KEYCOM Corp.). The magnetic permeability measured here is referred to as a "pre-immersion magnetic permeability".

Thereafter, the rectangular sample was immersed in 10 g of hydrochloric acid having a concentration of 10% by mass for 30 minutes, taken out, washed with water, and dried. The magnetic permeability (μr') thereof was measured at a frequency of 100 MHz in the same manner as described above. The magnetic permeability measured here is referred to as a "post-immersion magnetic permeability".

A magnetic permeability ratio before and after the immersion in hydrochloric acid was calculated by the following expression. It can be said that, as the value of the calculated magnetic permeability ratio is larger, the decrease in magnetic permeability in an acidic environment is smaller.

Magnetic permeability ratio=[z(Pre-immersion magnetic permeability−1)/(Post-immersion magnetic permeability−1)]×100

Example 2

In the same manner as in Example 1, a cured film was manufactured and various measurements were performed, except that the metal particles were changed to iron-based amorphous alloy particles (average particle size: see Table 1, coercive force Hc: 4.7 Oe, Fe content: 87.2% by mass, Si content: 6.8% by mass, Cr content: 2.5% by mass, B content: 2.5% by mass).

Example 3

In the same manner as in Example 1, a cured film was manufactured and various measurements were performed, except that the metal particles were changed to molybdenum permalloy alloy particles (average particle size: see Table 1, coercive force Hc: 8.1 Oe, Ni content: 79.8% by mass, Fe content: 16.2% by mass, Mo content: 3.9% by mass).

Example 4

In the same manner as in Example 1, a cured film was manufactured and various measurements were performed, except that, in a case of preparing the coating liquid, 6 parts by mass of Ni—Zn ferrite particles (average particle size and coercive force: see Table 1) was added thereto.

Example 5

In the same manner as in Example 1, a cured film was manufactured and various measurements were performed, except that the metal particles were changed to molybdenum permalloy alloy particles (average particle size: see Table 1, coercive force Hc: 6.2 Oe, Ni content: 79.8% by mass, Fe content: 16.2% by mass, Mo content: 3.9% by mass).

Example 6

In the same manner as in Example 4, a cured film was manufactured and various measurements were performed, except that Ni—Zn ferrite particles having the average particle size and coercive force shown in Table 1 were used as the Ni—Zn ferrite particles.

Example 7

In the same manner as in Example 4, a cured film was manufactured and various measurements were performed, except that Ni—Zn ferrite particles having the average particle size and coercive force shown in Table 1 were used as the Ni—Zn ferrite particles.

Example 8

In the same manner as in Example 4, a cured film was manufactured and various measurements were performed, except that the metal particles were changed to iron-based amorphous alloy particles (average particle size: see Table 1, coercive force Hc: 4.7 Oe, Fe content: 87.2% by mass, Si content: 6.8% by mass, Cr content: 2.5% by mass, B content: 2.5% by mass).

Example 9

In the same manner as in Example 4, a cured film was manufactured and various measurements were performed, except that the metal particles were changed to iron nickel alloy particles (average particle size: see Table 1, coercive force Hc: 12.3 Oe, Fe content: 49.5% by mass, Ni content: 50.3% by mass).

Example 10

In the same manner as in Example 4, a cured film was manufactured and various measurements were performed, except that the epoxy resin was changed to JER871 (epoxy equivalent: see Table 1) manufactured by Mitsubishi Chemical Corporation.

Example 11

In the same manner as in Example 4, a cured film was manufactured and various measurements were performed, except that the metal particles were changed to molybdenum permalloy alloy particles (average particle size: see Table 1, coercive force Hc: 8.1 Oe, Ni content: 79.8% by mass, iron content: 16.2% by mass, molybdenum content: 3.9% by mass).

Comparative Example 1

In the same manner as in Example 4, a cured film was manufactured and various measurements were performed, except that Ni—Zn ferrite particles having the average particle size and coercive force shown in Table 1 were used as the Ni—Zn ferrite particles.

Comparative Example 2

In the same manner as in Example 4, a cured film was manufactured and various measurements were performed, except that Ni—Zn ferrite particles having the average particle size and coercive force shown in Table 1 were used as the Ni—Zn ferrite particles.

Comparative Example 3

In the same manner as in Example 2, a cured film was manufactured and various measurements were performed, except that, in a case of preparing the coating liquid, the dispersing agent was not used.

Comparative Example 4

In the same manner as in Example 4, a cured film was manufactured and various measurements were performed, except that the epoxy resin was changed to JER827 (epoxy equivalent: see Table 1) manufactured by Mitsubishi Chemical Corporation.

Comparative Example 5

In the same manner as in Example 4, a cured film was manufactured and various measurements were performed, except that the epoxy resin was changed to JER152 (epoxy equivalent: see Table 1) manufactured by Mitsubishi Chemical Corporation.

The results are shown in Table 1 (Tables 1-1 to 1-3).

TABLE 1

| | | Example 1 | Example 2 | Example 3 | Example 4 | Example 5 |
|---|---|---|---|---|---|---|
| Metal particles | Alloy component | Ni, Fe, Mo | Fe, Si, Cr, B | Ni, Fe, Mo | Ni, Fe, Mo | Ni, Fe, Mo |
| | Average particle size (μm) | 8.1 | 5.2 | 12.0 | 8.1 | 4.0 |
| | Part by mass | 100 | 100 | 100 | 100 | 100 |
| Ferrite particles | Average particle size (μm) | — | — | — | 0.8 | 0.8 |
| | Coercive force (Oe) | — | — | — | 46.1 | 46.1 |
| | Part by mass | — | — | — | 6 | 6 |

TABLE 1-continued

| | | | | | | |
|---|---|---|---|---|---|---|
| Epoxy resin | Epoxy equivalent (g/eq) | 403 | 403 | 403 | 403 | 403 |
| Dispersing agent | | Y | Y | Y | Y | Y |
| Filling rate of magnetic particles (%) | | 71 | 72 | 73 | 74 | 71 |
| Void ratio (%) | | 0.03 | 0.02 | 0.02 | 0.02 | 0.03 |
| Magnetic permeability (μr') | | 14.8 | 14.1 | 15.4 | 15.4 | 14.0 |
| Loss tangent (tan δ) | | 0.31 | 0.24 | 0.38 | 0.27 | 0.25 |
| Magnetic permeability ratio before and after immersion in hydrochloric acid | | 0.99 | 0.78 | 0.99 | 0.99 | 0.99 |
| Observation of cracks | | No crack | No crack | No crack | No crack | No crack |

| | | Example 6 | Example 7 | Example 8 | Example 9 | Example 10 | Example 11 |
|---|---|---|---|---|---|---|---|
| Metal particles | Alloy component | Ni, Fe, Mo | Ni, Fe, Mo | Fe, Si, Cr, B | Fe, Ni | Ni, Fe, Mo | Ni, Fe, Mo |
| | Average particle size (μm) | 8.1 | 8.1 | 5.2 | 9.9 | 8.1 | 12.0 |
| | Part by mass | 100 | 100 | 100 | 100 | 100 | 100 |
| Ferrite particles | Average particle size (μm) | 0.8 | 0.8 | 0.8 | 0.8 | 0.8 | 0.8 |
| | Coercive force (Oe) | 29.5 | 15.2 | 46.1 | 46.1 | 46.1 | 46.1 |
| | Part by mass | 6 | 6 | 6 | 6 | 6 | 6 |
| Epoxy resin | Epoxy equivalent (g/eq) | 403 | 403 | 403 | 403 | 440 | 403 |
| Dispersing agent | | Y | Y | Y | Y | Y | Y |
| Filling rate of magnetic particles (%) | | 73 | 74 | 71 | 74 | 72 | 72 |
| Void ratio (%) | | 0.02 | 0.01 | 0.03 | 0.01 | 0.02 | 0.02 |
| Magnetic permeability (μr') | | 15.6 | 15.8 | 15.8 | 15.1 | 15.3 | 15.6 |
| Loss tangent (tan δ) | | 0.33 | 0.35 | 0.25 | 0.3 | 0.27 | 0.38 |
| Magnetic permeability ratio before and after immersion in hydrochloric acid | | 0.99 | 0.99 | 0.78 | 0.91 | 0.98 | 0.99 |
| Observation of cracks | | No crack | No crack | No crack | No crack | No crack | No crack |

| | | Comparative Example 1 | Comparative Example 2 | Comparative Example 3 | Comparative Example 4 | Comparative Example 5 |
|---|---|---|---|---|---|---|
| Metal particles | Alloy component | Ni, Fe, Mo | Ni, Fe, Mo | Fe, Si, Cr, B | Ni, Fe, Mo | Ni, Fe, Mo |
| | Average particle size (μm) | 8.1 | 8.1 | 5.2 | 8.1 | 8.1 |
| | Part by mass | 100 | 100 | 100 | 100 | 100 |
| Ferrite particles | Average particle size (μm) | 1.3 | 2.7 | — | 0.8 | 0.8 |
| | Coercive force (Oe) | 27.0 | 32.2 | — | 46.1 | 46.1 |
| | Part by mass | 6 | 6 | — | 6 | 6 |
| Epoxy resin | Epoxy equivalent (g/eq) | 403 | 403 | 403 | 185 | 175 |
| Dispersing agent | | Y | Y | N | Y | Y |
| Filling rate of magnetic particles (%) | | 67 | 63 | 65 | 72 | 72 |
| Void ratio (%) | | 0.25 | 0.41 | 0.33 | 0.02 | 0.03 |
| Magnetic permeability (μr') | | 13.1 | 12.8 | 13.1 | 15.3 | 15.4 |
| Loss tangent (tan δ) | | 0.33 | 0.28 | 0.23 | 0.26 | 0.27 |
| Magnetic permeability ratio before and after immersion in hydrochloric acid | | 0.99 | 0.99 | 0.78 | 0.99 | 0.99 |
| Observation of cracks | | No crack | No crack | No crack | With cracks | With cracks |

From the results shown in Table 1, it could be confirmed that, with the magnetic resin compositions of Examples, it was possible to form a cured product with a high magnetic permeability μr' in a high frequency band (100 MHz) and with suppressed occurrence of cracks during processing.

The embodiment of the present invention is useful in the technical field of various electronic components.

What is claimed is:

1. A magnetic resin composition comprising:

magnetic particles; and an epoxy resin having an epoxy equivalent of 400 g/eq or more, wherein a filling rate of the magnetic particles is 71% or more and 74% or less on an area basis, the magnetic particles include metal particles and ferrite particles, the average particle size of the metal particles is 4.0 μm or more, and the average particle size of the ferrite particles is 0.9 μm or less.

2. The magnetic resin composition according to claim 1, wherein a void ratio is less than 0.30% on an area basis.

3. The magnetic resin composition according to claim 1, wherein the metal particles include Ni and Fe.

4. The magnetic resin composition according to claim 3, wherein the metal particles further include Mo.

5. The magnetic resin composition according to claim 1, wherein an average particle size of the metal particles is less than 10.0 μm.

6. The magnetic resin composition according to claim 1, wherein a coercive force Hc of the ferrite particles is 30.0 Oe or more.

7. A cured product obtained by curing the magnetic resin composition according to claim 1.

8. The cured product according to claim 7, wherein a void ratio of the magnetic resin composition is less than 0.30% on an area basis.

9. The cured product according to claim 7, wherein the metal particles include Ni and Fe.

10. The cured product according to claim 9, wherein the metal particles further include Mo.

11. The cured product according to claim 7, wherein an average particle size of the metal particles is less than 10.0 μm.

12. The cured product according to claim 7, wherein a coercive force Hc of the ferrite particles is 30.0 Oe or more.

13. An electronic component comprising: the cured product according to claim 7.

* * * * *